G. F. ROWLEY.
COMBINATION SOIL PULVERIZER AND SEEDER ATTACHMENT FOR PLOWS.
APPLICATION FILED AUG. 22, 1912.
1,074,208.
Patented Sept. 30, 1913.
3 SHEETS—SHEET 1.
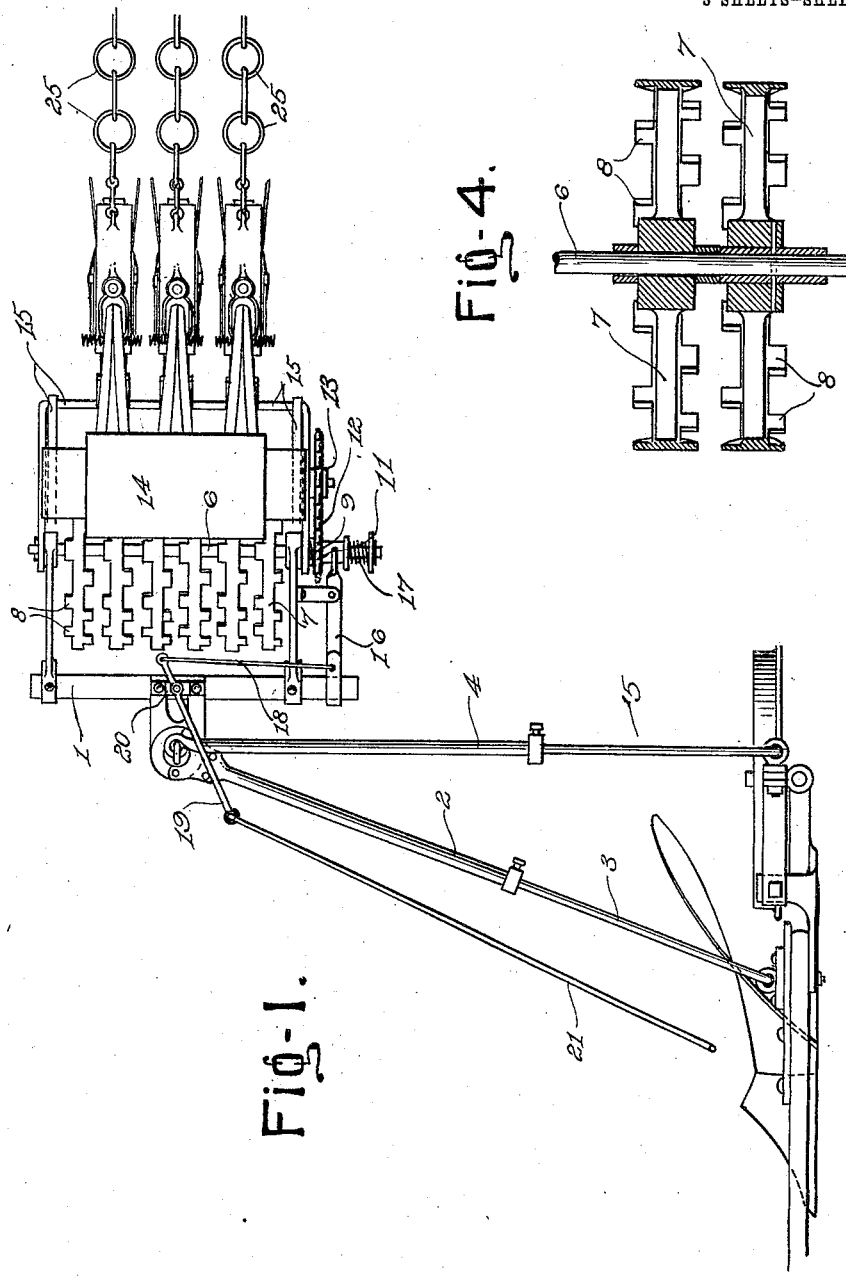
Witnesses:
George F. Rowley.
Inventor
By
Attorneys

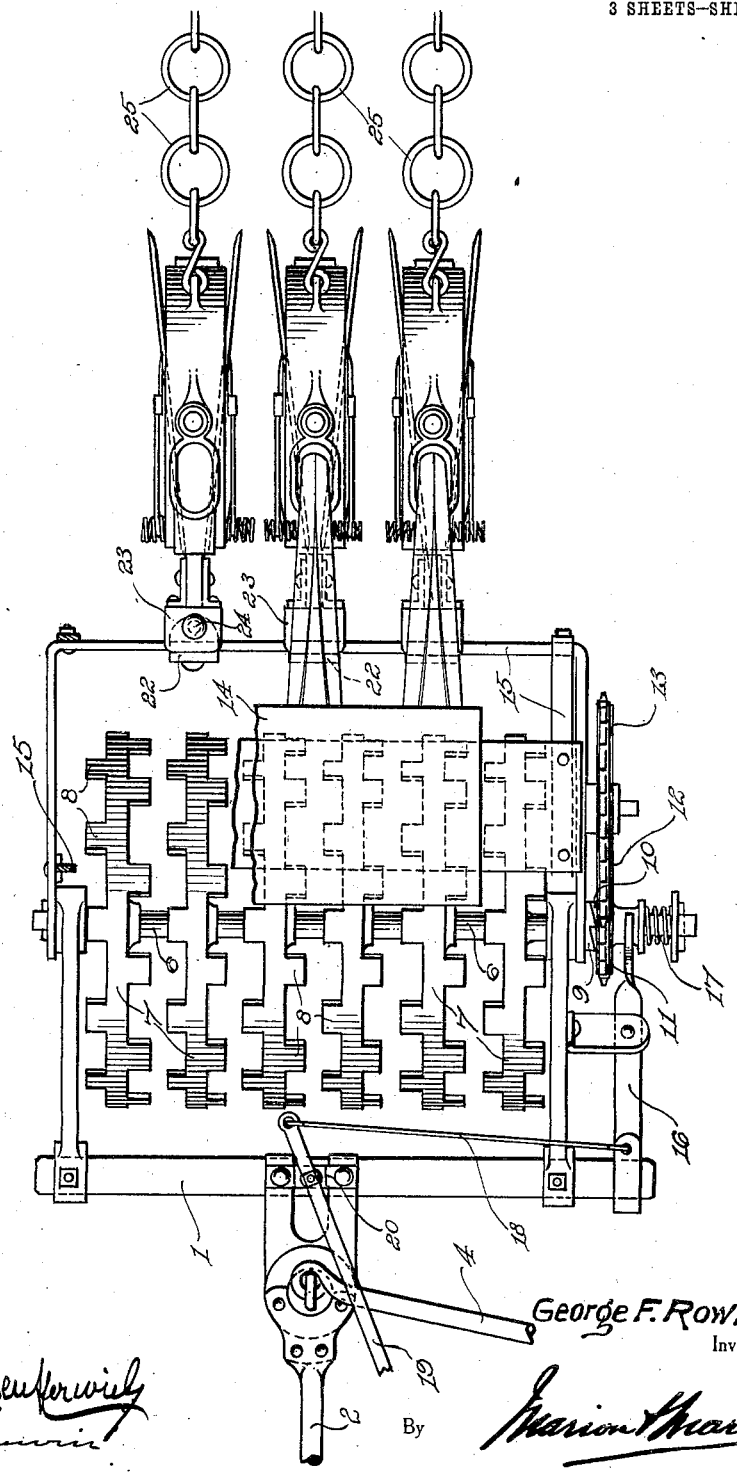

G. F. ROWLEY.
COMBINATION SOIL PULVERIZER AND SEEDER ATTACHMENT FOR PLOWS.
APPLICATION FILED AUG. 22, 1912.
1,074,208.
Patented Sept. 30, 1913.
3 SHEETS—SHEET 3.
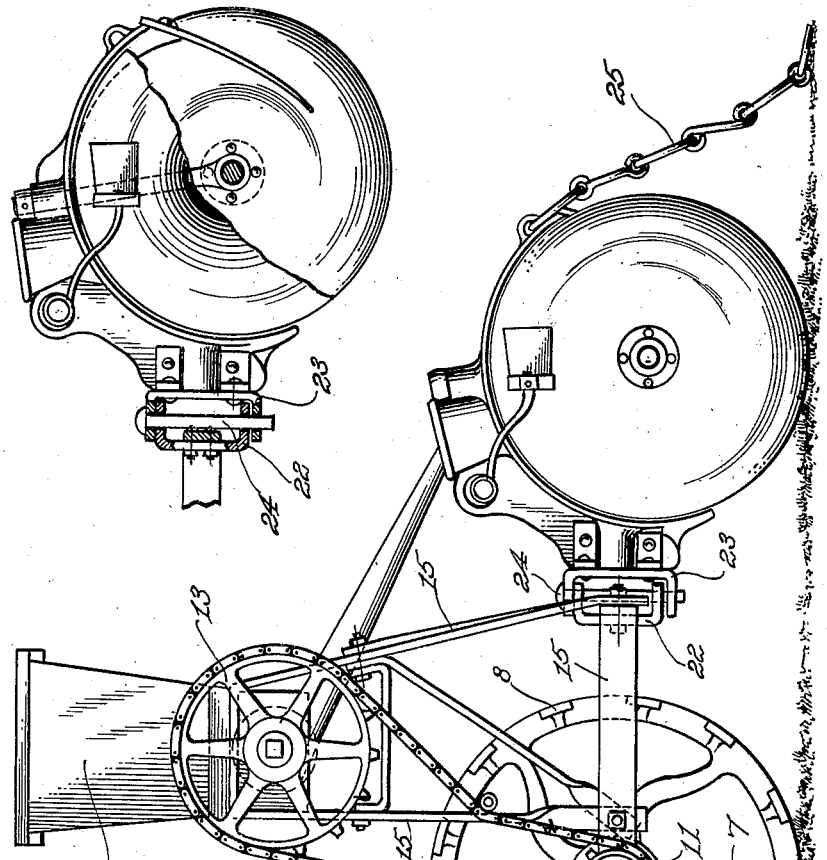
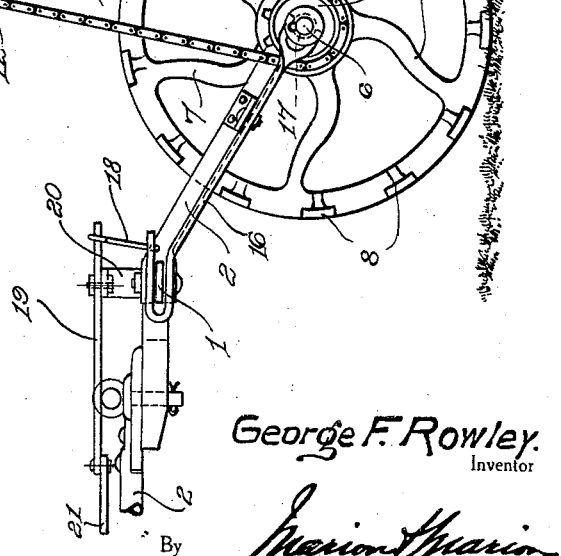
Witnesses:
George F. Rowley.
Inventor
By
Attorneys

UNITED STATES PATENT OFFICE.

GEORGE FRANKLIN ROWLEY, OF OXBOW, SASKATCHEWAN, CANADA.

COMBINATION SOIL-PULVERIZER AND SEEDER ATTACHMENT FOR PLOWS.

1,074,208.  Specification of Letters Patent.  Patented Sept. 30, 1913.

Application filed August 22, 1912. Serial No. 716,426.

*To all whom it may concern:*

Be it known that I, GEORGE FRANKLIN ROWLEY, a subject of the King of Great Britain, residing at Oxbow, Province of Saskatchewan, Canada, have invented certain new and useful Improvements in Combination Soil-Pulverizers and Seeder Attachments for Plows; and I do hereby declare that the following is a full, clear, and exact description of the invention, such as will enable others skilled in the art to which it appertains to make and use the same.

The invention to be hereinafter described relates to a combination pulverizer and seeder attachment for plows.

In order to more clearly disclose the construction, operation, and use of the invention, reference should be had to the accompanying drawings forming part of the present application.

Throughout the several figures of the drawings like reference characters designate the same parts.

In the drawings: Figure 1 is a top plan view, as applied; Fig. 2 is a similar view of the attachment, separate; Fig. 3 is a side elevation of Fig. 2; Fig. 4 is a detail cross sectional view through several of the pulverizer wheels, assembled; and Fig. 5 is an enlarged cross section of the grain drill connection with the drill frame.

The main objects of the invention are to provide a simple, efficient, economical, durable, and compact plow attachment which will be capable of thoroughly pulverizing the plowed ground, and then immediately successively planting and covering, so that the successive operations of plowing, pulverizing, planting, and covering may all be carried out at the same time.

Referring to the drawings in detail, 1 indicates the draft frame of the attachment and 2 a tubular bar swiveled to the forward part thereof. In this tube is adjustably and telescopically mounted a rod 3 the outer end of which is adapted to be attached to a plow beam or the like. A telescopic brace comprising a tube 4 and rod 5 also connects frame 1 with the plow beam to insure parallelism in the travel of the plow and draft frame, as will be well understood.

In the frame 1 is journaled the axle 6 on which are mounted a plurality of pulverizing and packing wheels 7 each having a rim provided with a plurality of small pulverizing and packing plates 8 projecting alternately in opposite directions and in the same plane as the rim. As the wheels revolve these plates meet and crush or pulverize the newly plowed clods and lumps and, at the same time, pack the pulverized earth. At least one of the wheels is fixed to the axle to cause it to rotate therewith, the others being loose on the axle and all wheels being spaced or separated by suitable spacing sleeves, washers, or the like, all as clearly shown in Fig. 4.

A clutch member 9 is fixed to one end of the axle and is adapted to engage and drive a coöperating clutch member 10 on the hub of a sprocket wheel 11 which is freely slidable on the axle toward and from the clutch member 9. From the sprocket wheel 11 a sprocket chain 12 is passed over and drives a sprocket wheel 13 for operating the usual feed mechanism in the grain drill hopper 14 which is carried by a drill frame 15 movably mounted on the axle.

The side brace members of the frame 15 are rigidly secured to a U-shaped base frame the ends of which are pivotally mounted on the ends of the axle 6; thus permitting vertical motion of the frame 15 as a whole.

A clutch lever 16 fulcrumed on the draft frame 1 is used for disengaging clutch member 10 which is held normally engaged by spring 17 or any other well known means. The clutch lever is connected by a link 18 to an actuating lever 19 fulcrumed on a small bridge 20 of frame 1 and this lever, in turn, is connected to a pull rod or bar 21 extended to within easy reach of the operator.

On the rear part of the frame 15 are swiveled a plurality of seed drills each comprising the usual frame tube and a pair of convergent disks for making trenches to receive the grain from the tubes.

The special swivel connection comprises a U-shaped plate 22 secured to frame 15, a similar plate 23 secured to the grain drill, and a pivot pin 24 passed through the alined arms of both plates, all as clearly shown in Figs. 3 and 5.

To the rear of each seed drill is secured a drag chain 25 for adequately covering the seed planted by the drill.

One of the main objects of the swivel connection between the frame 15 and each drill is to permit easy turning of the machine when it reaches the end of the field. At such time, the drills will all swing on their swivels and there will be no undue strain or twisting action.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a plow, a draft frame, connections between said frame and plow, an axle journaled in said draft frame, land pulverizing and packing wheels carried by said axle, a drill frame carried by said axle, a grain hopper carried by said drill frame, feed mechanism therein, means for driving said mechanism from the aforesaid axle, a clutch interposed in said means, a lever fulcrumed on the draft frame and connected to one member of said clutch, a second lever, a link connecting said levers, and a pull rod connected to said second lever.

2. In combination, a plow, a draft frame, telescopically adjustable connections between said frame and plow, an axle journaled in said draft frame, land pulverizing and packing wheels carried by the axle, one or more of the said wheels being secured thereto so as to turn therewith, a drill frame pivotally mounted on said axle so as to be vertically movable, a grain hopper carried by said drill frame, feed mechanism therein, means for driving said mechanism from the aforesaid axle, independent laterally movable drills carried by said drill frame, and drag chains carried by said drills.

3. In combination, a plow, a draft frame, connections between said frame and plow, an axle journaled in said draft frame, land pulverizing and packing wheels carried by said axle, a drill frame carried by said axle, a grain hopper carried by said drill frame, feed mechanism therein, means for driving said mechanism from the aforesaid axle, drills carried by said drill frame, drag chains carried by said drills, and swivel connections between said drills and said drill frame.

In witness whereof I have hereunto set my hand in the presence of two witnesses.

GEORGE FRANKLIN ROWLEY.

Witnesses:
JAMES EDGAR ROWLEY,
ALEXANDER KING MALCOMSON.

Copies of this patent may be obtained for five cents each, by addressing the "Commissioner of Patents, Washington, D. C."